Aug. 30, 1932.  E. J. FRANKLIN  1,874,487
COMBINATION ASH GATE AND AIR INLET SYSTEM FOR FURNACES
Filed Aug. 15, 1928  7 Sheets-Sheet 1

INVENTOR
Edward J. Franklin
BY Arthur P. Knight
Alfred W. Knight
ATTORNEYS.

Aug. 30, 1932.   E. J. FRANKLIN   1,874,487
COMBINATION ASH GATE AND AIR INLET SYSTEM FOR FURNACES
Filed Aug. 15, 1928   7 Sheets-Sheet 2

INVENTOR
Edward J. Franklin
BY
ATTORNEYS.

Aug. 30, 1932.  E. J. FRANKLIN  1,874,487
COMBINATION ASH GATE AND AIR INLET SYSTEM FOR FURNACES
Filed Aug. 15, 1928   7 Sheets-Sheet 3

INVENTOR
Edward J. Franklin.
BY
ATTORNEYS.

Aug. 30, 1932.  E. J. FRANKLIN  1,874,487
COMBINATION ASH GATE AND AIR INLET SYSTEM FOR FURNACES
Filed Aug. 15, 1928   7 Sheets-Sheet 7

INVENTOR
Edward J. Franklin.
BY
ATTORNEYS.

Patented Aug. 30, 1932

1,874,487

UNITED STATES PATENT OFFICE

EDWARD J. FRANKLIN, OF SALT LAKE CITY, UTAH

COMBINATION ASH GATE AND AIR INLET SYSTEM FOR FURNACES

Application filed August 15, 1928. Serial No. 299,841.

This invention relates to an improvement in furnaces designed primarily for burning powdered or pulverized fuels, said improvement comprising a combination ash gate and air inlet damper which in addition to forming the usual closure at the furnace bottom will provide a means for ingress and regulation of air for combustion and distribution of this air into the combustion chamber.

An important object of the invention is to provide in connection with a furnace for burning powdered fuels, an ash gate which will permit continual discharge of ash from the bottom of the combustion chamber and at the same time will provide for cooling the ash or refuse product.

A further object of the invention is to provide a means by which the "slagging" of ash or other incombustible matter falling to or deposited in the furnace bottom during the operation of the furnace is prevented. This is accomplished through the cooling effect of the air passing through the gate-damper system and not by the cooling effect of any adjacent water tubes, water screens, or hollow wall construction such as are now commonly in use. Thus it will be seen that this combination gate-damper system may be applied with equal benefit to a furnace whose lower portion is lined with either water tubes or with refractory material and also whether or not the furnace is provided with a so-called water screen.

Another important object of the invention is to provide for effective supply and distribution of air for combustion into the combustion chamber.

The conventional modern boiler furnace designed for burning pulverized fuel is usually provided with a multiplicity of so-called air inlet ports located in the side and front walls of the furnace, for the admission of the secondary air for combustion. Experience has shown that air entering these parts is prone to follow lanes up the walls of the furnace or to produce unequal stratification in the combustion zone. In either case, the intimacy of the admixture of this secondary air with the suspended particles of pulverized fuels is questionable.

With my arrangement, air is admitted over nearly the total area of the furnace bottom directly into the combustion zone, causing an intimate mixture of this air with the particles of pulverized fuels, thereby promoting more perfect combustion within the furnace.

The amount of incoming air required is dependent upon, and is in proportion to, the amount of draft carried in the furnace, which in turn is related to the rating at which the boilers or furnaces are being operated. Thus it is readily seen that by connecting the gate-damper operating mechanism into a system of automatic draft control apparatus (of which several kinds are in existence) the adjustment of the gate-damper openings may be automatically maintained to suit furnace conditions, the gate-dampers acting as primary or secondary dampers as conditions may demand.

A further advantageous result of the invention is the reclamation of a portion of the heat contained in the ash or refuse, by heating the incoming air as it passes through the ash being discharged through the gate-damper system.

When burning pulverized fuel in a furnace equipped with this type of gate-damper, the inert ash or refuse falling to the bottom of the furnace is cooled by the entering air and with the gates in a position as normally set for combustion, the major portion of these products pass out of the furnace through the openings in which the air enters the furnace. The remaining refuse products are removed by rotating the gates to such a position as will allow these products to be ejected into any convenient ash disposal system.

In many installations, fans are required to force the necessary secondary air into the furnace. My system eliminates the need for such fans, as the air is introduced into the combustion chamber by the draft maintained in the furnace. Thus investment in equipment and costs of operating these fans are avoided.

Further objects are the simplification of the construction of the furnace bottom adjacent to the ash gates, prolonged life of these parts and a reduction in maintenance costs.

It should be understood that for the purpose of the following descriptions, wherever the term "gate" is used, it refers to the combination ash gate and air inlet damper.

In the following description the same numbers apply to the same parts in each of the several figures.

Figure 1:
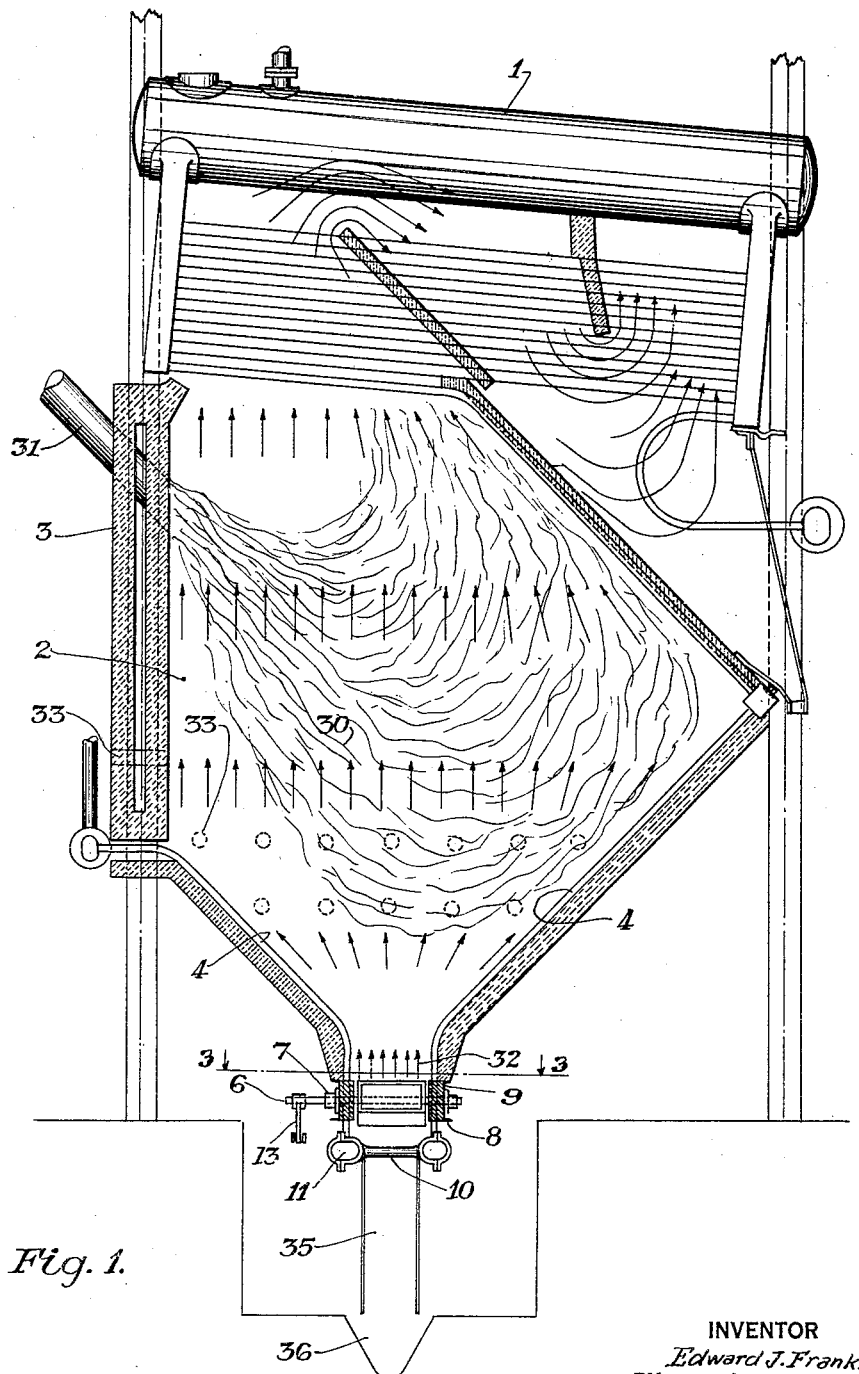
Fig. 1 represents a section through a boiler and furnace showing a water tube wall lining in the furnace, and illustrating the application of my invention thereto.

Referring to the figures: 1 indicates a steam boiler of any design whatsoever, being shown for convenience only as a horizontal water tube boiler; it being understood that any other type of boiler might be substituted therefor. 2 indicates the combustion space surrounded by suitable walls, as for instance any suitable design or combination of refractory surfaces 3 and water walls 4, in Fig. 1. It is understood that the construction of the furnace walls has no connection whatsoever with the efficacy of this invention.

The gates 5 are securely or demountably attached upon a shaft 6, carried in bearings 7 which are fixed to a part of the structure 8 forming the framework of the furnace bottom. This framework may be of any design suitable for the purposes in view.

Considering the gates to be used with a water wall furnace, the water wall tubes 4, adjacent to the gates 5 are shielded by means of suitable cast metal or refractory blocks or plates 9 secured in place by any convenient means, such as by bolts, forming smooth surfaces along the sides of the gates and preventing infiltration of air around said water wall tubes. The struts 10 (see Figs. 4 and 6) between the water wall headers 11 are for the purpose of preventing excessive displacement of the water wall tubes due to expansion and contraction.

Considering the gate system to be used with a refractory wall furnace, the framework structure 8 of the furnace bottom is protected from heat and abrasion by the cast metal or refractory plates or blocks, 9a (see Figs. 2 and 8), suitably mounted upon said structure adjacent to the gates.

In Fig. 1, aprons 35, constructed of any desired material, are shown as provided to guide the falling ash into a convenient ash sluice, conduit or other receptacle 36, whence the refuse is carried away in any desired manner. It should be understood that, in all cases, ash conduits or receptacles of some kind must be provided beneath the ash gates. These conduits, sluice ways or receptacles are omitted in all figures except Fig. 1, for the sake of clearness. When the aprons 35 are applied, the air is admitted either at the ends of the aprons adjacent to the side walls of the furnace, or through suitable ports provided in the aprons themselves. The use of these aprons will depend almost entirely upon physical conditions prevailing at any given installation.

No direct reference is made to the arrangement of supporting structure for the entire furnace, it being understood that in all cases the particular design of such a structure shall be governed by the dictates of good engineering practice under the conditions and circumstances prevailing.

Figure 7:
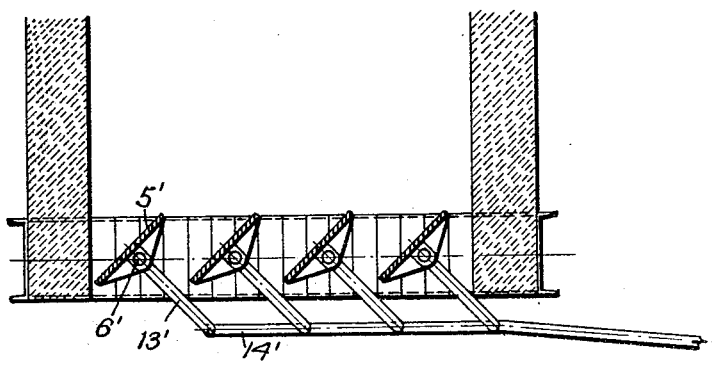
Fig. 7 is a sectional elevation showing a series of flat surface gates not lined or provided with a surface of refractory material.

Referring to the detailed construction of the gates, they are each composed essentially of a suitable metallic box-like structure 5 (Fig. 4), the metal of which is so disposed as to form a seating or attachment means for the refractory lining 12, which may be made of pre-formed refractory material blocks, or of plastic refractory material molded directly into place within the gate body. It is understood that the gate body may be so made as to present to the interior of the furnace a flat cast metal face, which may be as shown at 5' in Fig. 7, mounted on shafts 6' and operated by links 13' and bar 14' in the manner hereinafter described, either solid or perforated as conditions may require. The air passing over and around the gates, in that case, operates to cool the iron to within serviceable limits.

Figure 4:
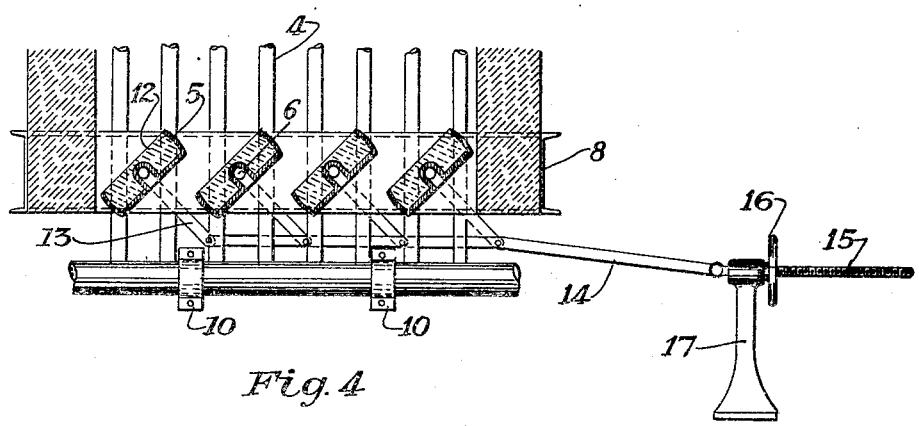
Fig. 4 is a sectional elevation along the plane 4—4 in Fig. 3.

The gates 5 are mounted either rigidly or demountably upon the shaft 6 in a manner such that both will rotate together, said shaft being mounted in suitable journals or bearings 7, attached to the furnace framework 8 in any desired manner. Firmly fixed to the end of the shaft 6 is a lever arm 13, connecting at its end to a linkage system 14, such that the angle of gate opening may readily be controlled, as, for instance, by means of the screw shaft 15, and hand wheel 16, the screw shaft being slidably but non-rotatively mounted upon a suitable support 17. The gates are mounted on shaft 6 so as to extend at an inclination to the horizontal as shown in Fig. 4 and the angle of inclination can be adjusted by the means above described, it being understood, however, that it is desirable to maintain an angle of inclination to the horizontal sufficient to insure that any ash falling on the gates 5 will slide off of such gates by gravity into the ash pit below.

Figure 9:
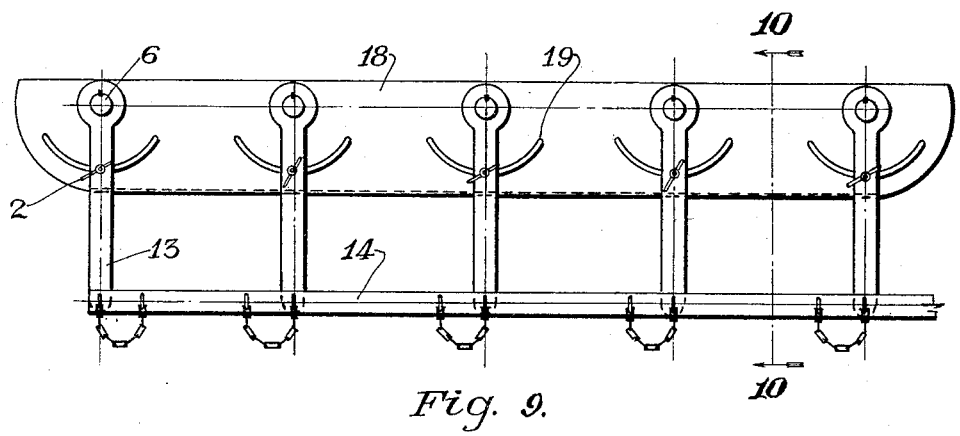
Fig. 9 is an elevation showing a locking device for the gates.
Figure 10:
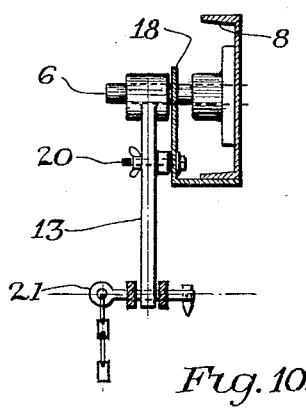
Fig. 10 is a sectional elevation along the plane 10—10 in Fig. 9.

Referring to Figs. 9 and 10, there is shown a means whereby any required number of gates may be disconnected from the linkage system and locked in any desired position, leaving the remaining gates to be operated as desired to adjust the admission of air into the furnace. In these figures, 18 represents a member attached to the furnace framework and having cut into it a series of slots 19, corresponding to a locking bolt 20 mounted upon the gate lever arm 13. The connection between the lever arm 13 and the linkage system 14, may be made by means of the self locking pin 21 or other suitable means. By disconnecting the pin 21 from engagement with the lever arm and links, any desired gate or gates may be clamped in any desired position leaving all other gates attached to, and capable of being operated by the linkage system.

Figure 5:
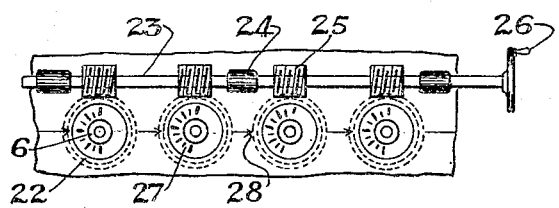
Fig. 5 is a detail showing the application of the gearing to the gate operating mechanism, as illustrated in Fig. 2.

As shown in Fig. 5, a system of gearing may be substituted for the linkage and lever system above described. For example, a worm wheel 22 may be fixed to each gate shaft 6. A shaft 23, carried in suitable bearings or journals 24, attached to the furnace structure, has fixed to it a series of worms 25 engaging the worm wheels 22, in such manner that rotation of the hand wheel 26 will cause the gates to move to any desired angular position relative to the normal closed position.

A graduated scale 27 may be provided on the worm wheels 22 to show, by relation to the pointers 28, the angular positions of the gates 5. It is understood that where the words "hand wheel" are mentioned, as under designations 16 and 26, that any other type of motive power, such as an electric motor, belt and pulley, hydraulic, air or steam cylinders, etc., may readily be substituted, being designated in general as 29 in Fig. 13.

In the operation of the furnace, pulverized fuel, such as powdered coal or coke, is supplied to the combustion chamber by burner or nozzle means 31, and the gates 5 are opened sufficiently to admit the proper amount of air for combustion and to permit egress of unconsumed material by gravitative action the gates 5 being so spaced and so adjusted that a clear passage is provided between the gates for the descent of the unconsumed material, and said gates being maintained at sufficiently steep inclination to permit the unconsumed material to slide downwardly thereon.

Figure 2:
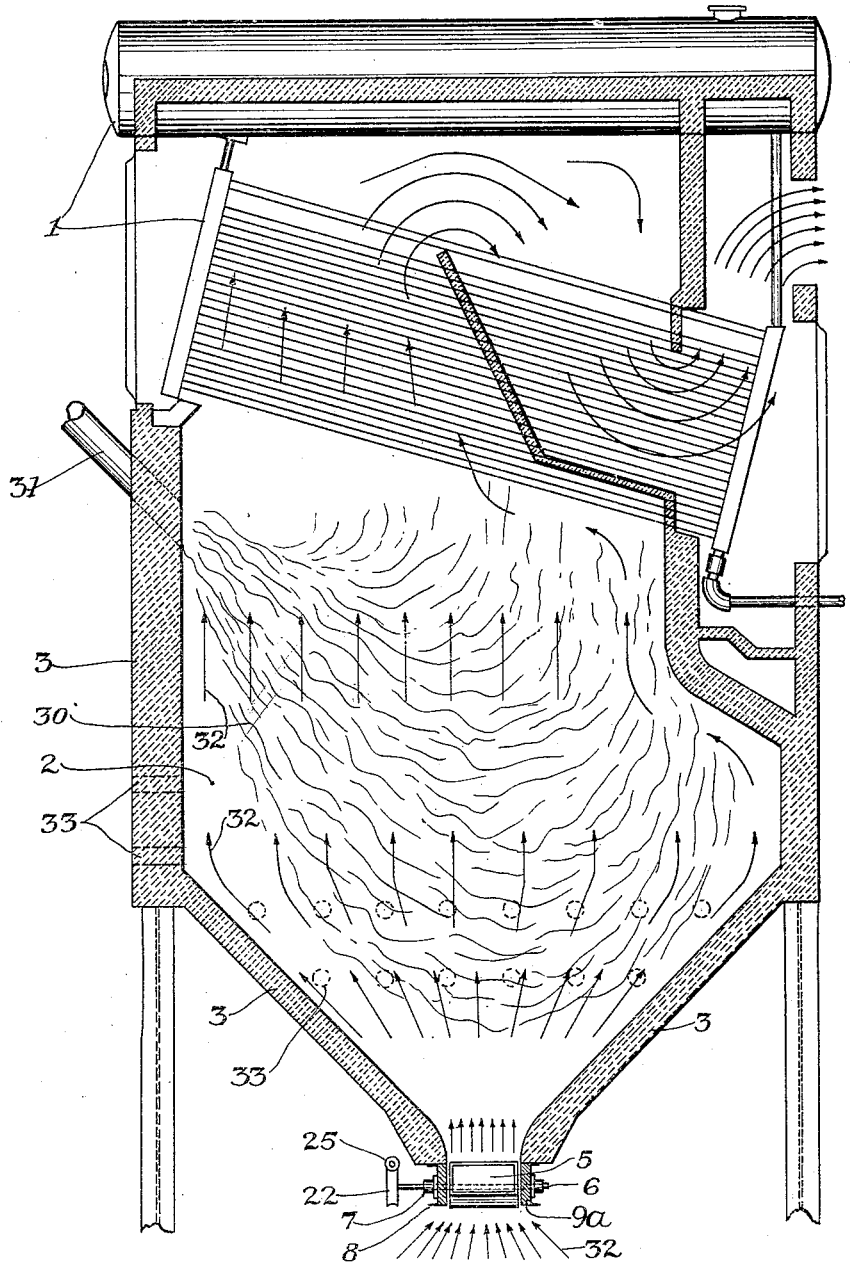
Fig. 2 is a view similar to Fig. 1, showing a refractory lining of the entire furnace.
Figure 3:
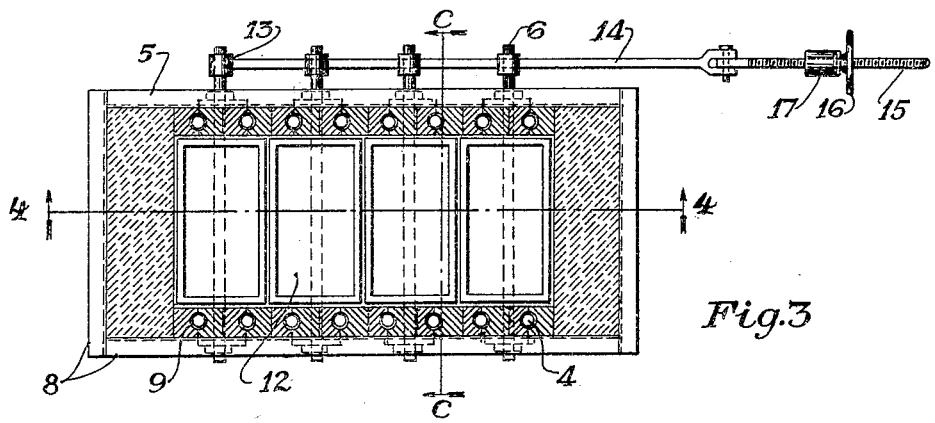
Fig. 3 is a plan view along the plane 3—3 in Fig. 1.

Referring to Figs. 1 and 2, the wavy lines 30 indicate in general the paths of the fuel particles projected into the furnace combustion chamber 2, from the burner or nozzle apparatus 31. The arrows 32 indicate the paths of particles of air entering the furnace combustion chamber 2, through the openings between the gates 5, when said gates are in an angular position with respect to their normal or closed position. Consideration of the path of the air after entering the combustion chamber, and expanding through the influence of the heat within this chamber, will indicate the extent to which complete and intimate mixture with the fuel particles is obtained.

This mixture is much more complete than when air is admitted through the relatively small air ports which are usually provided as indicated in dotted lines at 33 located in the furnace walls, resulting in a more complete combustion of the suspended fuel within a given time.

The cooling action of the incoming air 32 upon the ash and other hot refuse deposited from the combustion zone is also apparent from inspection of Figs. 1 and 2.

Figure 6:
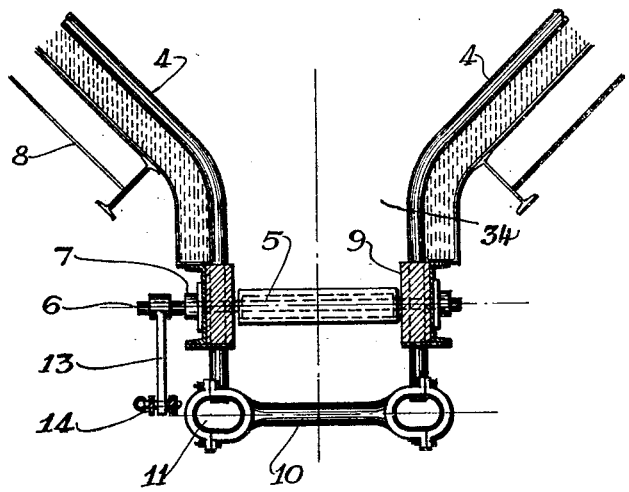
Fig. 6 is an enlarged sectional elevation of the lower portion of the water wall lined furnace shown in Fig. 1.
Figure 8:
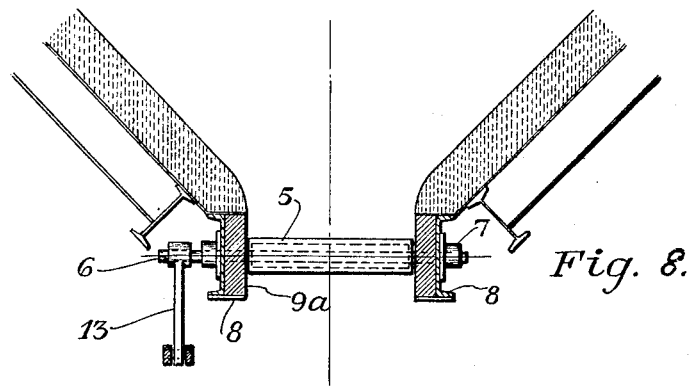
Fig. 8 is an enlarged sectional elevation similar to lower portion of Fig. 2, but indicating a linkage actuating mechanism connection instead of the gearing indicated in Fig. 2.
Figure 11:
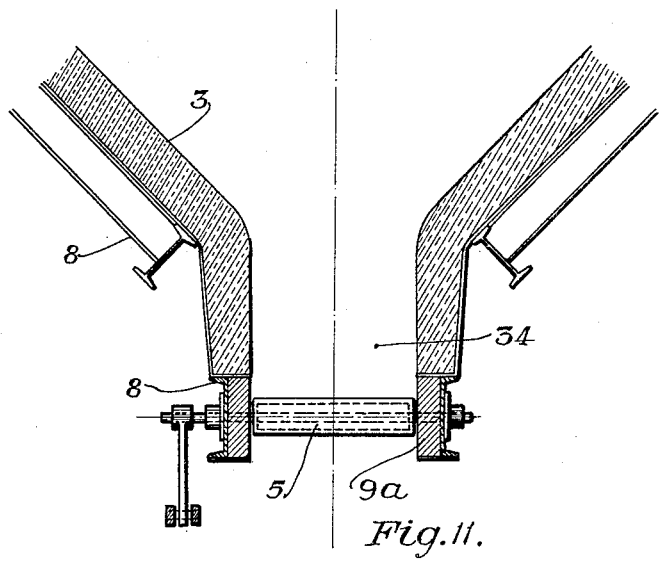
Fig. 11 is a sectional elevation of a refractory lined furnace bottom showing a deep ash well.

Referring to Figs. 6 and 11, 34 represents a relatively deep well, which is the preferable arrangement when using fuel having a high ash content of low fusibility. Fig. 8 shows the preferable arrangement when using fuels of low ash content and high fusibility. It should be noted that the use of this ash well is not dependent upon any particular type of furnace bottom wall or hopper construction, for its efficiency in operation.

Figure 12:
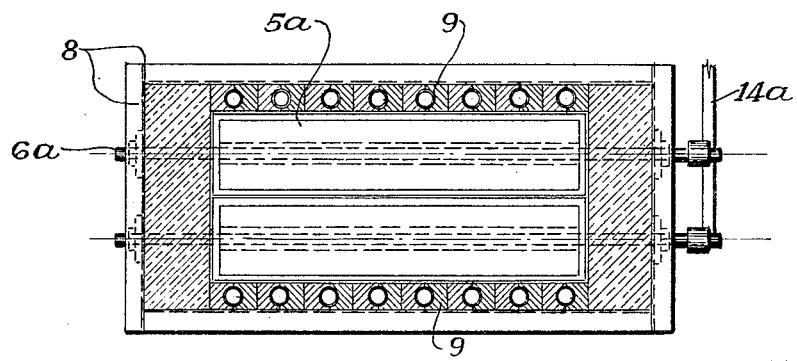
Fig. 12 is a sectional plan of a furnace bottom showing the gates arranged longitudinally instead of laterally as in Fig. 3.

In Fig. 12, 5a represents a gate or series of gates mounted longitudinally in the furnace bottom upon the shaft 6a, and operated by the actuating system 14a, corresponding to the gate 5, shaft 6 and linkage 14 in other figures. This arrangement is included to show the universality of the application of this type of gate.

Figure 13:
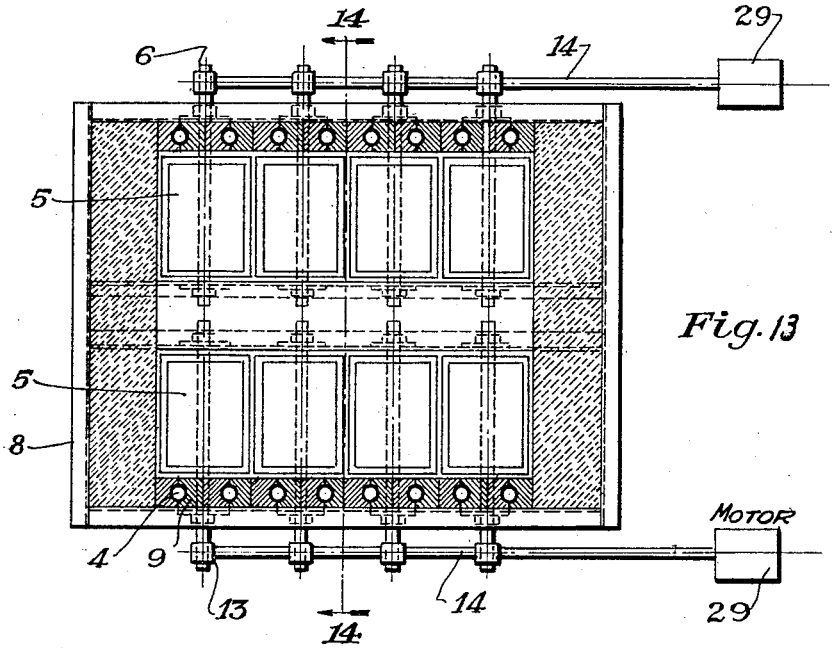
Fig. 13 is a sectional plan showing multiple groups of gates as differentiated from the single group shown in Fig. 3.
Figure 14:
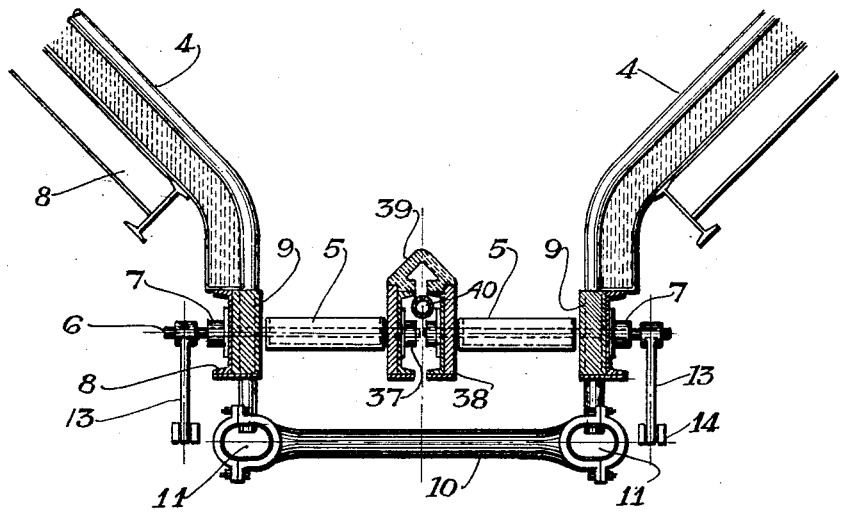
Fig. 14 is a sectional elevation along the plane 14—14 in Fig. 13.

Referring to Figs. 13 and 14, the gates 5 are indicated in multiple rows, to cover the situation wherein the furnace bottom is of relatively large area. Under these circumstances, the inboard bearings 37 for the shafts 6 are mounted upon a suitable structure 38, upon the top of which is mounted the cricket 39, which may be of any suitable material and ventilated for air cooling as indicated, carrying, if desired, a water tube, indicated at 40, attached to the water circulating system of the boiler, for the cooling of this cricket.

In each of the above described forms of the invention the gate constitutes a regulating or controlling means which serves to regulate and distribute the supply of air and at the same time permit the ash or unconsumed material to fall through the spaces between the gate devices. It will be understood that the gate devices will be adjusted by the means above described so as to provide the proper supply of air and at the same time provide sufficiently large openings for passage of the ash.

In general it is to be understood that the application of the gate system as described is not limited to the illustrations shown in the various figures, but is applicable to any type of furnace bottom of hopper construction. In each of the forms above described the ash gate members are sufficiently inclined to ensure that ash falling therein will slide downward into the ash pit, while at the same time the air entering between the gate members serves to cool the ash and prevent slagging. The mounting of the gate members is such as to provide for such inclination thereof while permitting adjustment so as to control the amount of air supplied. The incoming air, by reason of its contact with the gate structure also tends to cool such structure and prevent deterioration thereof by the heat. By contact with the ash and with the gate structure the incoming air is preheated and economy of fuel is thereby attained. Furthermore, inasmuch as the gate extends the full width of the furnace bottom, the preheated air is delivered to the combustion chamber in such manner as to produce most effective mixture and contact of the air and the finely divided fuel.

I claim:

1. In a furnace for burning finely divided solid fuel, the combination of a combustion chamber provided with a burner for supplying fuel thereto, said combustion chamber having an opening in its bottom and a combination ash gate and air damper mechanism located at said opening in the bottom of the combustion chamber and provided with adjustable pivoted gates adapted and arranged to be adjusted to vary the inclination of the gates and the spaces between the gates so as to regulate the admission and distribution of air and permit downward gravitative egress of unconsumed material between the gates from the combustion chamber, and means for so adjusting the gates.

2. In a furnace for the purpose stated, the combination of a combustion chamber provided with a burner structure for supplying pulverized fuel to the combustion chamber and a combination ash gate and air damper mechanism located in the bottom of the combustion chamber and provided with a plurality of gates pivotally mounted, and means for moving said gates to vary their inclination and securing them in steeply inclined positions to permit downward passage of unconsumed matter from the combustion chamber between the gates and to regulate the supply and distribution of air into the combustion chamber.

In testimony whereof I have hereunto subscribed my name this 8th day of August, 1928.

EDWARD J. FRANKLIN.